April 18, 1961    C. C. CONGER ET AL    2,980,843
VOLTAGE REGULATOR FOR GENERATORS
Filed Sept. 26, 1957
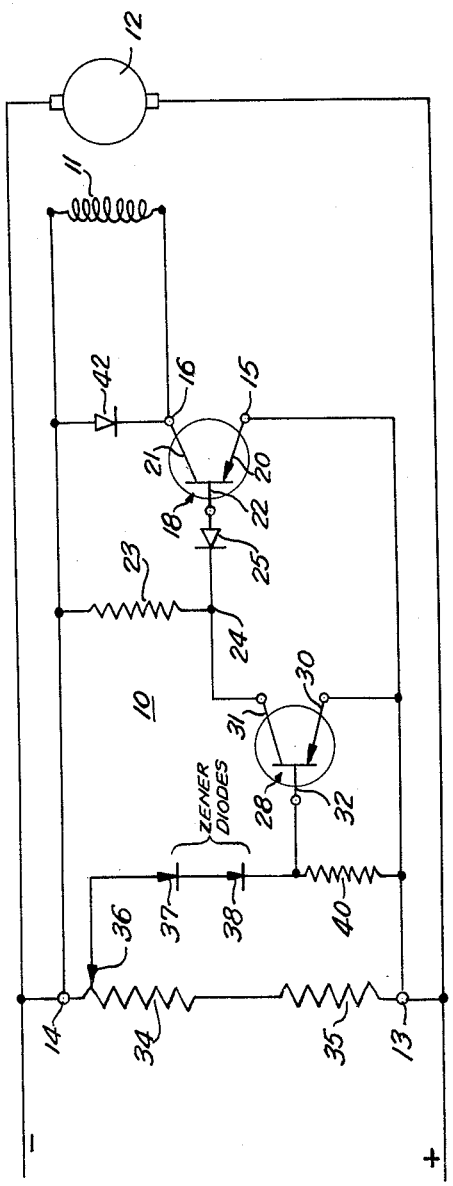
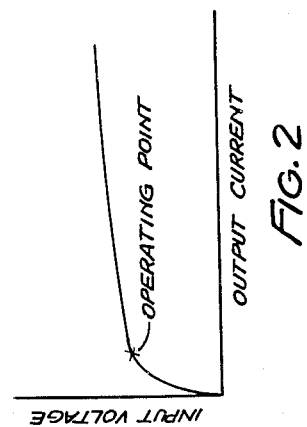
INVENTORS
CHANNING C. CONGER
JAMES C. LAURENCE
BY
ATTORNEYS United States Patent Office 2,980,843
Patented Apr. 18, 1961

2,980,843

VOLTAGE REGULATOR FOR GENERATORS

Channing C. Conger, Olmsted Falls, and James C. Laurence, Berea, Ohio, assignors to The Controllix Corporation, Bedford, Ohio, a corporation of Ohio Filed Sept. 26, 1957, Ser. No. 686,421

9 Claims. (Cl. 322—28)

The present invention relates to regulating systems, and particularly to voltage regulating systems for maintaining a constant voltage at the supply terminals for a load.

An important object of the present invention is to provide a proportional type regulating apparatus for regulating a current in accordance with variations in voltage appearing across the input of the regulating apparatus, in which the output circuit of the regulating apparatus comprises the output circuit of a transistor having an input voltage which is varied from a minimum value in a manner dependent upon the variations in voltage across the input terminals of the regulating apparatus to vary the output of the transistor over a substantial range from a minimum current corresponding to the minimum voltage and in accordance with variations of the input voltage, and in which the input circuit to the transistor includes an element for rendering the transistor nonconductive when the input voltage thereto approaches its minimum value.

Another object of the present invention is the provision of a regulating apparatus of the type referred to above in which the input voltage of the transistor is the ouput voltage of a second transistor having an input voltage which varies from zero in a manner dependent on the voltage at the input of the regulating apparatus.

Another object is to provide a control system in which current flowing in the output circuit is controlled in accordance with an input voltage having a minimum value and in which the transistor is rendered nonconductive when said input voltage approaches said minimum.

Yet another object of the present invention is the provision of a new and improved compact, simple, and inexpensive apparatus for regulating the current in the field coil of a generator in accordance with the line of voltage of the generator, in which apparatus a transistor has output terminals connected in series with the field and is normally variably conductive in response to an input voltage having a minimum value and which varies in response to variations in line voltage to regulate the current flowing in the field and in which the transistor is rendered nonconductive when the input voltage drops to its minimum value or to a value close thereto.

A further abject of the present invention is to provide a regulating apparatus of the type referred to for controlling current in the field coil of a generating machine and which is provided with means for preventing damage to the regulating apparatus upon collapse of the field.

A still further object of the present invention is to provide, for regulating the field current of a generating machine in accordance with the output voltage, a voltage regulating apparatus in which the conductivity of a transistor having its output terminals in series with the load is varied to control the field current and in which the field current is a maximum when the output voltage is at the desired value or below and is decreased proportionally to a voltage increase above the desired value.

Yet another object of the present invention is to provide a new and novel apparatus for regulating the current in the field coil of a generating machine in which the impedance of the field circuit when the field current is a maximum is substantially that presented by the field coil and in which the field current is regulated by varying, proportionately to the output voltage of machine, from a maximum to a value approximately zero, the input voltage of a transistor having its output terminals connected in series with the load.

A still further object of the present invention is to provide a voltage regulating apparatus in which the input circuit of a transistor, which has its output terminals in series with the field coil, is connected across the power supply for the field coil and includes an impedance whose value substantially determines the maximum field current.

It is also an object to provide a regulating apparatus as in the preceding paragraph in which a second transistor having input terminals connected to output voltage sensing means has its output terminals connected between the impedance and one side of the power supply in parallel circuit with the input terminals of the first-mentioned transistor.

It is another object of the present invention to provide a new and improved voltage regulating apparatus in which the regulated voltage to be sensed is connected across a Zener diode means which breaks down at approximately the voltage to be maintained and a resistor connected in series with the Zener diode means and in which the voltage across the resistor or a portion thereof constitutes the input voltage to a transistor whose output effects control of the regulated voltage, the value of the resistor being chosen so that when the diode means conducts, the current through the resistor is such as to nearly render the transistor conductive and preferably such that the transistor and the diode means are operating at linear portions of their characteristic curves when the voltage is at the desired level.

Further objects and advantages of the present invention will be apparent from the following detailed description of the embodiments thereof made with reference to the accompanying drawings forming a part of this specification, and in which Fig. 1 is a circuit diagram of the regulating apparatus of the present invention embodied in a control for a D.C. generator; and Fig. 2 is the characteristic curve of a transistor.

The present invention contemplates the provision of a control circuit wherein the output current of a transistor is to be controlled from approximately zero to a maximum in accordance with an input potential to the transistor, which input potential has a minimum absolute value, and wherein the input circuit to the transistor includes a circuit element for blocking the input current when the input potential thereto approaches its minimum. The present invention also contemplates the provision of a sensing circuit for sensing voltages above a predetermined magnitude and wherein Zener diode means and a resistor is connected in series across terminals to which the voltage to be sensed is applied and wherein the voltage drop across the resistor or a part thereof is the input potential for a transistor whose output provides a control voltage for effecting the control operation, the resistor being selected so that the transistor is just ready to conduct when the Zener diode means first conducts and preferably so that the Zener diode means operates on a linear portion of its reverse voltage current characteristic curve when the Zener diode means breaks down.

While the present invention is capable of use in various types of control circuits and regulating apparatuses it is particularly adapted for use in regulating the current in a field coil of a generator or alternator in accordance with the output voltage of the alternator or generator to maintain the output voltage substantially constant and is particularly adapted for use in the type of generator wherein it is desirable that maximum field current flow when the output of the generator is at rated voltage.

Referring to the drawing, a regulating appararatus 10 is provided for controlling the current flow in a field 11 of a D.C. generating machine 12. The regulating apparatus 10 has input terminals 13, 14 which are connected to the positive and negative terminals respectively of the generator 12, and output terminals 15, 16 which are connected in series with the field 11 across the terminals of the generator 12. The current flowing in the field 11 is controlled by a transistor 18, of the PNP type in the illustrated embodiment, having an emitter 20, a collector 21 and a base 22 and terminals therefor. The collector 21 is connected to the output terminal 16 of the regulating apparatus which is in turn connected to the positive side of the field coil, while the emitter 20 is connected to the output terminal 15 of the regulating apparatus which is, in turn, connected to the positive side of the generator 12. The conductivity of the collector-emitter path of the transistor 18 determines the output current of the transistor and, in turn, the voltage drop across the field 11 and the current therein.

The magnitude of the current flowing in the collector-emitter circuit of the transistor 18 is determined by the magnitude of the current in the input circuit of the transistor. The input circuit for the transistor 18 includes a resistor 23 having one terminal connected to the negative line from the generator 12 and the other terminal connected to a junction 24 which, in turn, is connected to the base of the transistor 18 through a rectifying element 25 is of the type having a low forward resistance side of the line through the emitter 20, the base 22 and the resistor 23 to the negative side of the line. The element 25 is of the type having a low forward resistance to all potentials thereacross except very small potential drops and normally does not present any significant resistance to the base current.

A transistor 28, preferably of the PNP type, having an emitter 30, collector 31 and a base 32, and terminals therefor, is connected to control the emitter-base potential of the transistor 18 and, in turn, the input current flowing in the base circuit of transistor 18. The emitter of the transistor 28 is connected to the positive line from the generator 12 while the collector 31 is connected to the junction 24 which, as described above, is in turn, connected to the negative line by resistor 23. It can now be seen that variations in the output current and in the collector-emitter voltage of transistor 28, as the conductivity thereof varies, will vary the potential drop across the output terminals of transistor 28 and the emitter-base potential of the transmitter base 18 to, in turn, vary the conductivity of the emitter-collector circuit of the collector 18 and the current flow to the field 11. As the output current of transistor 28 increases the emitter-collector voltage decreases to decrease the input voltage to the transistor 18, which effects a decrease in output current of transistor 18. The circuit works in a reverse manner when the output current of transistor 28 decreases.

The conductivity and the output current and voltage of the transistor 28 is controlled by the input voltage applied to the input terminals 13, 14 of the regulating apparatus. A voltage dividing circuit comprising series connected resistors 34, 35 is connected between the input terminals 13, 14. The resistor 34, which has one end thereof connected to terminal 14, is a potentiometer-type resistor having a sliding tap 36. The sliding tap 36 is connected to the terminal 13 through a pair of Zener diodes 37, 38 and a resistor 40 connected in series therewith. The resistor 40 has one terminal connected to the terminal 13 and its other terminal to one side of the series connected Zener diodes 37, 38, the other side of the diodes being connected to the tap 36. The Zener diodes 37, 38 prevent conduction of current in the series circuit including the resistor 40 and the diodes and a portion of the potentiometer resistor 34 until the voltage drop across the diodes 37, 38 reaches the Zener voltage. When the voltage drop reaches the Zener voltage of the diodes, the Zener diodes present a relatively low forward resistance and the voltage drop thereacross will remain substantially the same as long as the diodes remain conducting even though the voltage applied to the input terminals 13, 14 varies. In the illustrated and preferred embodiment, the Zener diodes conduct at approximately the voltage to be maintained at the terminals 13, 14.

The base 32 of the transistor 28 is connected to the terminal or junction common to the Zener diode 38 and the resistor 40 and the voltage drop across the resistor 40 provides an input potential for the transistor 28 which, after the Zener diodes break down, varies in accordance with the variation in voltage above the Zener voltage at the input terminals 13, 14 of the regulating apparatus. As the input voltage increases above the Zener voltage at the terminals 13, 14 the voltage drop across the Zener diodes remains substantially constant and the voltage drop across the resistor 40 will increase to increase the input current flowing in the input circuit comprising the emitter 30 and the base 32 to increase the conductivity of the emitter-collector path of the transistor and thereby increase the output current flowing through the emitter-collector path of the transistor 28 and the resistor 23. This also causes a drop in the collector-emitter potential of transistor 28. The increase in current flowing through the resistor 23 raises the potential of the junction 24 to decrease the potential drop and the current flowing between the emitter and base of the transistor 18 thereby decreasing the conductivity of the emitter-collector path of the transistor 18 to reduce the current flowing to the field 11. It can be seen, therefore, that if the voltage at the output terminals of the generator 12 increases after the Zener diodes have started to conduct, the described circuit will function to decrease the current flowing in the field 11 to counteract the increase in voltage at the terminals of the generator. Then, as the output voltage drops in response to the change of field current, the input current of transistor 28 will decrease to increase the input current to transistor 18, to again bring the field current to a maximum as the input voltage reaches the voltage to be maintained.

The regulating action may also be described as follows: If the regulated voltage at terminals 13, 14 should increase (i.e., become larger in absolute magnitude) then, since the potential across the Zener diodes 37, 38 is essentially constant regardless of current, the current through resistor 40 will increase, causing an increase in the input current of transistor 28 and a corresponding increase in the collector-emitter current of transistor 28.

Now the potential between the collector and emitter of transistor 28 is small compared to the voltage being regulated. Therefore, the total current through resistor 23 is nearly constant and is approximately equal to the regulated voltage divided by the value of resistor 23.

Since the current through resistor 23 is nearly constant as explained above, and since the collector-emitter current of transistor 28 will increase under the condition being considered, it follows that the input current in transistor 18 will decrease. The decrease in input current to transistor 18 will cause a decrease in the collector-emitter current of transistor 18 and the current in the alternator generator field. The decrease in field current will produce a decrease in the voltage being regulated, thus approximately restoring the regulated voltage to its original value.

The resistor 40 is preferably selected so that the current therethrough, when the Zener diodes first conduct, is such that the input potential to transistor 38 has a magnitude which is necessary to effect operation of said second transistor on the linear portion of the input voltage versus output current characteristics curve and is preferably about that which is necessary to have the transistor operating at the lowest potential point on the linear portion of the curve. Fig. 2 shows the input voltage versus output current characteristic curve for a transistor and the preferred operating point is indicated by an X mark.

The resistor 40 is also preferably chosen so that in addition to effecting operation the transistor 28 on the linear portion of its characteristic curve, it also effects operation of the diodes 37, 38 on the linear portion of their reverse voltage current characteristic.

It can be seen from the above that the voltage drop across the emitter and collector terminals of the transistor 28 is the input potential for the transistor 18 and is a maximum when the Zener diodes 37, 38 are nonconductive, and the transistor 28 cut off. When the transistor 28 is cut off, the current flowing in the input circuit, the emitter base circuit, of the transistor 18 is the maximum obtainable and is essentially determined by the resistance of resistor 23 inasmuch as the resistance of the emitter-base path of transistor 18 and of the diode 22 is relatively small compared to the resistance of resistor 23. Maximum field current, therefore, flows when transistor 28 is cut off, that is, when the Zener diodes are nonconducing or have the Zener voltage thereacross and the magnitude of the maximum field current is determined by the value of resistor 23. It will be noted that when maximum field current is flowing, the impedance of the field circuit is substantially that of the field coil since the impedance of the collector-emitter path of transistor 18 is low as a result of the input current flowing in the base-emitter circuit of the transistor.

As the voltage increases above the value where the Zener diodes conduct, the current output of transistor 28 will increase and the voltage across the emitter and collector terminals will decrease since the voltage drop in the collector-emitter circuit is small. The collector-emitter voltage of transistor 28, however, cannot be reduced to zero, since there must be a voltage drop to produce a current and will therefore reach a minimum value where further increases in the voltage at terminals 13, 14 will not appreciably affect the output voltage of the transistor 28. At this point the transistor has reached one limit of its range of regulation. The input current, however, flowing in the base-emitter circuit of the transistor 18 is high enough, when transistor 18 is operating at the described condition where its output potential is a minimum, to be objectionable and the diode 25 is included in the base circuit of transistor 18 to block the base current when the latter approaches its value corresponding to the minimum input potential. The diode element 25 presents a low forward resistance for all voltages thereacross except those below a certain very small magnitude at which it is rendered conductive. When the voltage thereacross drops below this magnitude the rectifying element will not conduct and will block the base current in the transistor 18 and, for all practical purposes, no current will flow in the field circuit. In the illustrated circuit the rectifying element may be one, by way of example, which does not conduct until a ½ volt is impressed thereacross, while the collector-emitter voltage of transistor 28 may vary up to several times ½ a volt.

In accordance with the preferred embodiment of the present invention, a rectifying element 42 is connected from the collector 21 to the negative side of the power supply in parallel with the field 11 and is poled to conduct current from the negative side of the line to the output terminal 16. The rectifying element 42 presents a high resistance to current flowing from the collector 16 to the negative side of the line and is normally nonconducting. When conditions are such as to cause a collapse of the field 11, a high voltage would develop which would normally damage the transistor 18 but which will be shorted by the rectifying element 42 to prevent damage to the transistors.

It can now be seen that the present invention provides a simple, compact, and inexpensive regulating system for controlling the flow of current in a load in accordance with the variations of an input voltage to the system and that the control of the output current may be effected through a range from zero to a maximum with the output current being proportional to variations in the input voltage for substantially the entire range of control even though a control signal derived from the input voltage applied to the terminal systems has a minimum voltage of absolute value and is utilized as the input voltage to a transistor whose output current constitutes the load current.

While the preferred embodiment of the present invention has been described in considerable detail, it is hereby our intention to cover all modifications, constructions, and arrangements which fall within the ability of those skilled in the art and within the scope and spirit of the present invention.

Having thus described our invention, we claim:

1. In a regulating-type control system for variably energizing a circuit element from no current to a maximum in response to a variable control signal which decreases when the energizing current for said circuit element is to be reduced and which has an effective minimum absolute value at which said energizing current is to be cut off, the energizing current for said circuit element to be varied in response to the variable control signal for a major portion of the range of the variable control signal, transistor means including base and collector and emitter terminals, means providing a source of potential, means connecting one of said emitter and collector terminals to one side of said source and the other of said emitter and collector terminals to one side of said element whereby said element is energized by current flowing in the collector-emitter path of said transistor and which current is to be controlled from zero to a maximum, said one terminal and said base terminal constituting the input terminals of said transistor, input circuit means connected to the base terminal of said transistor and to said one terminal to provide an input base current and including a variable impedance providing a variable input potential for said transistor variable between a maxium and an effective minimum close to zero to vary the output current of the transistor and variable with said variable impedance for a substantial portion of the range of variation thereof, the magnitude of said energizing current to be zero when said input potential is at its effective minimum, said input circuit means including a rectifying element having a breakdown voltage in a forward direction close to but above said minimum value and connected in circuit with said base terminal to conduct in a forward direction with respect to said base current and normally presenting a low impedance to said base current, but blocking said base current when said input potential approaches its minimum, said impedance being connected in shunt with said input terminals and said rectifying element, and said rectifying element having a low breakdown voltage in a forward direction as compared to its breakdown voltage in the opposite or reverse direction.

2. In a regulating-type control system as defined in claim 1 wherein said variable impedance comprises a second transistor having the collector and emitter thereof connected across the series circuit comprised of said rectifying element and said base terminal and said one terminal of the first mentioned transistor and said system further comprises means for applying an input signal to said second transistor to vary the conductivity of said second transistor and the input potential to the first mentioned transistor.

3. In a regulating-type control system for controlling the energization of a load element from no current to a maximum in response to a variable control signal which decreases to an effective minimum when the energizing current for said load element is to be cut off, a potential source, a transistor having a base terminal and a collector terminal and an emitter terminal, means connecting one of the collector and emitter terminals to one side of said potential source and the other to said load whereby current in the collector-emitter path of said transistor energizes said load, input circuit means connected to said base terminal and to the other side of said potential source and establishing a maximum input potential across said one terminal and said base terminal and a maximum input current in the base circuit of said transistor, said input circuit means comprising a resistor and a rectifying element connected in a series circuit, and variable impedance means connected to a point between said rectifying element and said resistor and to said one side of said potential source and variable from a maximum to a minimum impedance to vary the input potential across and the input current in said transistor to control the current in said load element between a maximum and a minimum, said rectifying element being connected into said series circuit to conduct the input current in said base circuit in a forward direction and having a breakdown potential close to but above the minimum potential of the input potential whereby said rectifying element has a low forward resistance to current in said input circuit means for all input potentials above a certain magnitude close to said minimum and said variable impedance being effective to control the output of said transistor for substantially the full range of variation, said rectifying element having a low breakdown potential in a forward direction as compared to its breakdown potential in the reverse or opposite direction and being connected to conduct said base current in a forward direction.

4. In a regulating circuit as defined in claim 3 wherein said variable impedance comprises a second transistor having the collector and emitter thereof connected to said base terminal through said rectifying element and to said one terminal of the first mentioned transistor and said system further comprises means for applying an input signal to said second transistor to vary the conductivity of said second transistor and the input potential to the first mentioned transistor.

5. A control system for controlling the field current in the field coil of a generating machine, a transistor having base and emitter and collector terminals, a potential source for energizing said field, means connecting one of said emitter and collector terminals to said coil and the other to one side of said potential source, input circuit means connected to said base terminal and to said other of said emitter and collector terminals to provide an input potential for establishing a base current in said transistor which is variable from a maximum to a relatively small minimum absolute value in a continuous manner to vary the current flow in said coil between a maximum and a relatively small value, said input circuit means including a rectifying element connected in circuit with said base terminal having a low breakdown potential in the direction of the base current as compared to its breakdown potential in the opposite or reverse direction and normally presenting a low impedance to said base current but exhibiting a high impedance to block said base current when said input potential approaches its said minimum value.

6. A control system as defined in claim 5, wherein said input circuit means includes a second transistor having output terminals connected to said base terminal and the said other of the terminals of the first mentioned transistor to provide a variable input voltage and wherein said system further comprises circuit means providing an input voltage to said second transistor in accordance with a second voltage indicative of the field current and which varies from substantially zero to a maximum, the last said circuit means including Zener diode means connected to provide a reference voltage for deriving said input voltage from said second voltage.

7. A control system as defined in claim 5 wherein said input circuit means includes a resistor connected to the other side of said line and in series with said rectifying element and said base terminal whereby the maximum input current to said transistor is substantially determined by the magnitude of said resistor and a second transistor having an emitter and collector with the collector-emitter path being connected between said resistor and said one side of said line whereby the emitter-collector potential of said second tarnsistor provides the variable input potential for the first-mentioned transistor.

8. In a regulating system for varying current in a load in accordance with voltage applied to terminals of the regulating system, a first transistor having a base terminal and a collector terminal and an emitter terminal, a potential source, means connecting one of the collector and emitter terminals to one side of potential source and the other to one side of said load whereby current in the collector-emitter path of said transistor energizes said load, input circuit means connected to said base terminal and to the other side of said potential source and establishing a maximum input potential across said one terminal and said base terminal and a maximum input current in the base circuit of said transistor, said input circuit means comprising a resistor and a rectifying element connected in series with said rectifying element being connected between said base terminal and said resistor, said rectifying element having a low breakdown potential in its forward direction as compared to its breakdown potential in the opposite or reverse direction and being connected to conduct the base current of said transistor in a forward direction, a second transistor having input and output terminals, a sensing circuit comprising Zener diode means and a resistor connected in series across the input terminals of the system, means connecting said resistor to the input of said second transistor whereby the voltage drop across said resistor provides the input potential for said second transistor to vary the conductivity of said second transistor in accordance with variations of voltage at the input of the system above a magnitude approximately equal to the Zener voltage of said Zener diode means, said resistor in series with said Zener diode means is of a magnitude which limits the current in said series circuit upon the breakdown of said Zener diode means to a magnitude such that the input potential to said second transistor is the lowest input potential necessary to effect operation of the second transistor on the linear portion of its input voltage versus output current characteristic curve and such that said Zener diode means is operating on a linear portion of its reverse voltage current characteristic curve, circuit means connecting the output terminals of said second transistor to said one side of said potential source and to said input circuit means at a point between said rectifying element and said resistor whereby variations in the conductivity of the second transistor varies the input potential to said first transistor, said rectifying element having a low forward resistance to current in said input circuit means for all input potentials above a magnitude approximately equal to the minimum potential drop across the output terminals of said second transistor and a high impedance to potentials below said magnitude whereby said first transistor is cut off when the output potential of said second transistor approaches a minimum.

9. In a regulating-type control system as defined in claim 1 wherein said variable control signal has a unidirectional potential.

References Cited in the file of this patent
UNITED STATES PATENTS

| 2,751,550 | Chase | June 19, 1956 |
| 2,802,938 | Herzog | Aug. 13, 1957 |
| 2,809,301 | Short | Oct. 8, 1957 |
| 2,859,356 | King | Nov. 4, 1958 |
| 2,862,175 | Guyton et al. | Nov. 25, 1958 |